(12) United States Patent
Tang et al.

(10) Patent No.: US 10,616,921 B2
(45) Date of Patent: Apr. 7, 2020

(54) UPLINK TRANSMISSION METHOD AND APPARATUS IN RANDOM ACCESS

(71) Applicant: HUAWEI TECHNOLOGIES CO., LTD., Shenzhen, Guangdong (CN)

(72) Inventors: Xun Tang, Beijing (CN); Wei Quan, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/907,012

(22) Filed: Feb. 27, 2018

(65) Prior Publication Data
US 2018/0192439 A1 Jul. 5, 2018

Related U.S. Application Data

(63) Continuation of application No. PCT/CN2015/088436, filed on Aug. 28, 2015.

(51) Int. Cl.
*H04W 4/00* (2018.01)
*H04W 74/08* (2009.01)
*H04W 74/00* (2009.01)

(52) U.S. Cl.
CPC ......... *H04W 74/08* (2013.01); *H04W 74/006* (2013.01)

(58) Field of Classification Search
USPC .................................. 370/252, 329; 375/341
See application file for complete search history.

(56) References Cited

U.S. PATENT DOCUMENTS

| 10,148,380 | B2 * | 12/2018 | Uchiyama | H04J 13/0007 |
|---|---|---|---|---|
| 2009/0238126 | A1 | 9/2009 | Sato et al. | |
| 2011/0243080 | A1 | 10/2011 | Chen et al. | |
| 2012/0188961 | A1 | 7/2012 | Suzuki et al. | |

(Continued)

FOREIGN PATENT DOCUMENTS

| CA | 2942582 A1 | 8/2015 |
|---|---|---|
| CN | 101541092 A | 9/2009 |

(Continued)

OTHER PUBLICATIONS

Extended European Search Report issued in European Application No. 15902514.7 dated Jun. 21, 2018, 7 pages.

(Continued)

*Primary Examiner* — Phuongchau Ba Nguyen
(74) *Attorney, Agent, or Firm* — Fish & Richardson P.C.

(57) ABSTRACT

The present disclosure relates to an uplink transmission method in random access, which includes: selecting, by a user equipment (UE) after receiving a random access response message sent by a network-side device, a pilot signal from a plurality of pilot signals indicated by pilot signal parameter information sent by the network-side device; and sending, by the UE, uplink user data and the selected pilot signal to the network-side device on a time-frequency resource indicated by the random access response message. In some instances, when a plurality of UEs send a same random access preamble to a base station on a same random access resource, a probability that the plurality of UEs use different pilot signals when sending uplink user data can be increased.

13 Claims, 11 Drawing Sheets

(56) References Cited

U.S. PATENT DOCUMENTS

| | | | |
|---|---|---|---|
| 2013/0322413 A1* | 12/2013 | Pelletier | H04W 72/1289 |
| | | | 370/336 |
| 2014/0286182 A1* | 9/2014 | Chen | H04L 1/0026 |
| | | | 370/252 |
| 2018/0041988 A1* | 2/2018 | Lee | H04W 56/00 |
| 2018/0123855 A1* | 5/2018 | Yoshizawa | H04J 13/16 |

FOREIGN PATENT DOCUMENTS

| | | |
|---|---|---|
| CN | 101940053 A | 1/2011 |
| CN | 102291845 A | 12/2011 |
| CN | 102469617 A | 5/2012 |
| CN | 102474885 A | 5/2012 |
| WO | 2013015606 A2 | 1/2013 |
| WO | 2015005701 A1 | 1/2015 |

OTHER PUBLICATIONS

3GPP TS 36.211 V12.6.0 (Jun. 2015);3rd Generation Partnership Project;Technical Specification Group Radio Access Network;Evolved Universal Terrestrial Radio Access (E-UTRA);Physical channels and modulation(Release 12),total 136 pages.

International Search Report issued in International Application No. PCT/CN2015/088436 dated May 27, 2016, 6 pages.

Office Action issued in Chinese Application No. 201580044399.6 dated May 10, 2019, 18 pages (with English translation).

\* cited by examiner

| | |
|---|---|
| UE contention resolution identity (Contention Resolution Identity) | Octet 1 (Oct 1) |
| UE contention resolution identity (Contention Resolution Identity) | Octet 2 (Oct 2) |
| UE contention resolution identity (Contention Resolution Identity) | Octet 3 (Oct 3) |
| UE contention resolution identity (Contention Resolution Identity) | Octet 4 (Oct 4) |
| UE contention resolution identity (Contention Resolution Identity) | Octet 5 (Oct 5) |
| UE contention resolution identity (Contention Resolution Identity) | Octet 6 (Oct 6) |
| Cell radio network temporary identity (C-RNTI) | Octet 7 (Oct 7) |
| Cell radio network temporary identity (C-RNTI) | Octet 8 (Oct 8) |

FIG. 6(b)

UPLINK TRANSMISSION METHOD AND APPARATUS IN RANDOM ACCESS

CROSS-REFERENCE TO RELATED APPLICATIONS

This application is a continuation of International Application No. PCT/CN2015/088436, filed on Aug. 28, 2015, the disclosure of which is hereby incorporated by reference in its entirety.

TECHNICAL FIELD

The present disclosure relates to the field of communications technologies, and in particular, to an uplink transmission method and apparatus in random access.

BACKGROUND

In a Long Term Evolution (LTE) system, when user equipment (UE) in a radio resource control (RRC) idle state needs to send uplink data, the UE first needs to implement uplink synchronization and establish an RRC connection. This procedure is a random access procedure. When the UE needs to be handed over to another cell, reestablish an RRC connection, re-obtain uplink synchronization, request an uplink resource for sending uplink user data, or the like, a random access procedure may also need to be executed.

The random access procedure executed in the foregoing several cases is generally a contention-based random access procedure. As shown in FIG. 1, a contention-based random access procedure mainly includes a process of sending four messages. These four messages are, respectively, a random access preamble message (msg1 for short) sent by UE to a base station, a random access response message (msg2 for short) sent by the base station to the UE, a scheduled message (msg3 for short) that is used to carry uplink user data and is sent by the UE to the base station, and a contention resolution message (msg4 for short) sent by the base station to the UE. The following details the process of sending these four messages.

When preparing to access a wireless network, the UE obtains 64 available random access preambles from a cell broadcast message that is broadcast by the base station. These 64 random access preambles are divided into two groups based on a size of the msg3. The UE randomly selects a random access preamble from one of the two groups according to an amount of data that is to be sent by the UE, and sends the random access preamble to the base station by adding the random access preamble to the msg1.

After the UE sends the random access preamble by using the msg1, the base station calculates a timing advance (TA), and sends the msg2 to the UE. The msg2 includes a detected preamble index of the random access preamble, the TA, and uplink grant information for transmission of the msg3. After receiving the msg2, the UE sends the msg3 on a time-frequency resource indicated by the UL-grant. The msg3 includes the uplink user data.

The UE may be UE in an idle state or in a connected state. If the UE is in the idle state, in the msg2, the msg2 sent by the base station further includes a temporary cell radio network temporary identifier (Temporary C-RNTI) of the UE; and in the msg3, the uplink user data sent by the UE includes a common control channel-service data unit (CCCH-SDU) and a preset pilot signal. If the UE is in the connected state, in the msg3, the uplink user data sent by the UE includes a C-RNTI and a preset pilot signal.

After detecting the msg3, for the UE in the idle state, the base station sends, to the UE, the CCCH-SDU carried in the msg3. After successfully detecting the msg4, the UE determines that the CCCH-SDU is data previously sent by the UE, and uses, as an actually used C-RNTI, the temporary C-RNTI received in the msg2. For the UE in the connected state, the base station uses a prior C-RNTI of the UE, and uses a physical downlink control channel (PDCCH) to implement contention resolution.

In the foregoing process, if a plurality of UEs select a same random access preamble, and send the same random access preamble to a base station on a same random access resource, after detecting the random access preamble, the base station cannot determine that the random access preamble is sent by a plurality of UEs. In this case, the base station calculates a TA according to a maximum multipath location at which signal energy is detected, and sends the msg2. Afterwards, all the plurality of UEs detect the preamble index carried in the msg2, and send the msg3 according to the TA sent by the base station and the time-frequency resource indicated by the UL-grant. Pilot signals used in the msg3 by the plurality of UEs are also the same. After the base station receives, on the time-frequency resource indicated by the UL-grant, the msg3 sent by the plurality of UEs within a maximum delay extension range, because the pilot signals used by the plurality of UEs are the same, the base station cannot correctly demodulate uplink user data sent by each UE. As a result, random access procedures of the plurality of UEs may all fail.

SUMMARY

Embodiments of the present disclosure provide an uplink transmission method and apparatus in random access, so as to resolve a problem of a relatively low success rate of contention-based random access procedures.

According to a first aspect, an uplink transmission method in random access is provided, including:

selecting, by user equipment UE after receiving a random access response message sent by a network-side device, a pilot signal from a plurality of pilot signals indicated by pilot signal parameter information sent by the network-side device; and sending, by the UE, uplink user data and the selected pilot signal to the network-side device on a time-frequency resource indicated by the random access response message.

With reference to the first aspect, in a first possible implementation, before the sending, by the UE, uplink user data and the selected pilot signal to the network-side device, the method further includes:

selecting, by the UE, a codebook from a plurality of candidate codebooks indicated by sparse code multiple access SCMA parameter information sent by the network-side device, and mapping the uplink user data to a codeword of the selected codebook; and the sending, by the UE, uplink user data and the selected pilot signal to the network-side device includes:

sending, by the UE to the network-side device, the selected pilot signal and the uplink user data mapped to the codeword.

With reference to the first possible implementation of the first aspect, in a second possible implementation, the selecting, by UE, a pilot signal from a plurality of pilot signals indicated by pilot signal parameter information sent by the network-side device includes:

selecting, by the UE from the plurality of pilot signals, a pilot signal corresponding to the selected codebook.

With reference to the first or the second possible implementation of the first aspect, in a third possible implementation, the selecting, by the UE, a codebook from a plurality of candidate codebooks indicated by SCMA parameter information sent by the network-side device includes:

determining, by the UE according to a used random access preamble and from the plurality of candidate codebooks indicated by the SCMA parameter information, at least one codebook corresponding to the random access preamble, where a codebook quantity of the at least one codebook is less than a quantity of the plurality of codebooks indicated by the SCMA parameter information; and selecting, by the UE, a codebook from the determined at least one codebook.

With reference to any one of the first to the third possible implementations of the first aspect, in a fourth possible implementation, determining, by the UE, the plurality of candidate codebooks indicated by the SCMA parameter information sent by the network-side device includes:

determining, by the UE as the plurality of candidate codebooks indicated by the SCMA parameter information, a plurality of codebooks that match a codeword length and a quantity of non-zero elements in a codeword that are indicated by the SCMA parameter information.

With reference to any one of the first to the fourth possible implementations of the first aspect, in a fifth possible implementation, the mapping, by the UE, the uplink user data to a codeword of the selected codebook includes:

selecting, by the UE based on a size of the uplink user data, a codeword quantity from a plurality of codeword quantities supported by each candidate codebook indicated by the SCMA parameter information; and mapping, by the UE, the uplink user data to the codeword of the selected codebook based on the selected codebook and the selected codeword quantity.

With reference to any one of the first to the fifth possible implementations of the first aspect, in a sixth possible implementation, after the sending, by the UE, uplink user data and the selected pilot signal to the network-side device, the method further includes:

detecting, by the UE, a feedback message of the network-side device on a physical hybrid automatic repeat request indicator channel PHICH resource corresponding to the selected pilot signal, where the feedback message is used to feed back an ACK message indicating that the uplink user data of the UE is correctly received or a NACK message indicating that the uplink user data of the UE is not correctly received; and retransmitting, by the UE, the uplink user data after detecting the non-acknowledgement NACK message.

With reference to the sixth possible implementation of the first aspect, in a seventh possible implementation, the selected codebook is a first codebook, and the retransmitting, by the UE, the uplink user data includes:

reselecting, by the UE, a second codebook different from the first codebook, mapping the uplink user data to a codeword of the second codebook, and reselecting, from the plurality of pilot signals indicated by the pilot signal parameter information, a pilot signal corresponding to the second codebook; and sending, to the network-side device on the time-frequency resource indicated by the random access response message, the uplink user data mapped to the codeword of the second codebook and the pilot signal corresponding to the second codebook.

With reference to the seventh possible implementation of the first aspect, in an eighth possible implementation, the reselecting, by the UE, a second codebook different from the first codebook includes:

reselecting, by the UE from a plurality of codebooks that match a codeword length and a quantity of non-zero elements in a codeword that are corresponding to the first codebook, the second codebook different from the first codebook; or adjusting, by the UE, a codeword length and/or a quantity of non-zero elements in a codeword that are/is corresponding to the first codebook, and reselecting the second codebook from a plurality of codebooks that match an adjusted codeword length and/or an adjusted quantity of non-zero elements in a codeword.

According to a second aspect, an uplink transmission method in random access is provided, including:

sending, by a network-side device, pilot signal parameter information to UE within a coverage area, where the pilot signal parameter information is used to indicate a plurality of candidate pilot signals to the UE;

detecting, by the network-side device, a plurality of pilot signals on a time-frequency resource indicated by a sent random access response message; and decoding, by the network-side device after detecting the plurality of pilot signals and based on the plurality of detected pilot signals, uplink user data sent by a plurality of user equipments UEs on the time-frequency resource.

With reference to the second aspect, in a first possible implementation, the decoding, by the network-side device based on the plurality of detected pilot signals, uplink user data sent by a plurality of UEs on the time-frequency resource includes:

performing, by the network-side device, uplink channel estimation based on each detected pilot signal, and determining a codebook corresponding to the pilot signal; and decoding, by the network-side device based on an uplink channel estimation result and the determined codebook, uplink user data corresponding to the pilot signal.

With reference to the first possible implementation of the second aspect, in second possible implementation, before the detecting, by the network-side device, a plurality of pilot signals, the method further includes:

sending, by the network-side device, sparse code multiple access SCMA parameter information to the UE within the coverage area, where the SCMA parameter information is used to indicate a plurality of candidate codebooks to the UE.

With reference to the second possible implementation of the second aspect, in a third possible implementation, the SCMA parameter information includes parameter information used to indicate one or more of the following information:

a codeword length of each candidate codebook;

a quantity of non-zero elements in a codeword of each candidate codebook; or a plurality of codeword quantities supported by each candidate codebook.

With reference to the second or the third possible implementation of the second aspect, in a fourth possible implementation, the detecting, by the network-side device, a plurality of pilot signals on a time-frequency resource indicated by a sent random access response message includes:

determining, by the network-side device according to a random access preamble used by the UE and from the plurality of candidate codebooks indicated by the SCMA parameter information, at least one codebook corresponding to the random access preamble, where a codebook quantity of the at least one codebook is less than a quantity of the plurality of codebooks indicated by the SCMA parameter information; and detecting, by the network-side device based on a pilot signal corresponding to each of the determined at least one codebook, the plurality of pilot signals on the time-frequency resource indicated by the sent random access response message.

With reference to the second aspect, in a fifth possible implementation, the decoding, by the network-side device based on the plurality of detected pilot signals, uplink user data sent by a plurality of UEs on the time-frequency resource includes:

decoding, by the network-side device based on the plurality of detected pilot signals and in a multi-UE multiple-input multiple-output MU-MIMO mode, the uplink user data sent by the plurality of UEs on the time-frequency resource.

With reference to any one of the second aspect, or the first to the fifth possible implementations of the second aspect, in a sixth possible implementation, after the decoding, by the network-side device, uplink user data, the method further includes:

sending, by the network-side device, feedback messages to the UEs on physical hybrid automatic repeat request indicator channel PHICH resources corresponding to the plurality of detected pilot signals, where the feedback message is used to feed back an ACK message indicating that the uplink user data of the UE is correctly received or a NACK message indicating that the uplink user data of the UE is not correctly received.

With reference to any one of the second aspect, or the first to the sixth possible implementations of the second aspect, in a seventh possible implementation, the plurality of UEs are in an idle state; and after the network-side device successfully decodes the uplink user data sent by the plurality of UEs on the time-frequency resource, the method further includes:

sending, by the network-side device, a contention resolution message to the plurality of UEs in the idle state, where the contention resolution message includes indication information indicating that the uplink user data sent by the plurality of UEs in the idle state is decoded successfully and a cell radio network temporary identifier C-RNTI allocated to each UE in the idle state.

According to a third aspect, an uplink transmission apparatus in random access is provided, including:

a selection module, configured to: after a random access response message sent by a network-side device is received, select a pilot signal from a plurality of pilot signals indicated by pilot signal parameter information sent by the network-side device, and transmit the selected pilot signal to a sending module; and the sending module, configured to send uplink user data and the selected pilot signal to the network-side device on a time-frequency resource indicated by the random access response message.

With reference to the third aspect, in a first possible implementation, the selection module is further configured to:

before the sending module sends the uplink user data and the selected pilot signal to the network-side device, select a codebook from a plurality of candidate codebooks indicated by sparse code multiple access SCMA parameter information sent by the network-side device, and map the uplink user data to a codeword of the selected codebook; and the sending module is specifically configured to:

send, to the network-side device, the selected pilot signal and the uplink user data mapped to the codeword.

With reference to the first possible implementation of the third aspect, in a second possible implementation, the selection module is specifically configured to:

select, from the plurality of pilot signals, a pilot signal corresponding to the selected codebook.

With reference to the first or the second possible implementation of the third aspect, in a third possible implementation, the selection module is specifically configured to:

determine, according to a random access preamble used by user equipment UE and from the plurality of candidate codebooks indicated by the SCMA parameter information, at least one codebook corresponding to the random access preamble, where a codebook quantity of the at least one codebook is less than a quantity of the plurality of codebooks indicated by the SCMA parameter information; and select a codebook from the determined at least one codebook.

With reference to any one of the first to the third possible implementations of the third aspect, in a fourth possible implementation, the selection module is specifically configured to:

determine, as the plurality of candidate codebooks indicated by the SCMA parameter information, a plurality of codebooks that match a codeword length and a quantity of non-zero elements in a codeword that are indicated by the SCMA parameter information.

With reference to any one of the first to the fourth possible implementations of the third aspect, in a fifth possible implementation, the selection module is specifically configured to:

select, based on a size of the uplink user data, a codeword quantity from a plurality of codeword quantities supported by each candidate codebook indicated by the SCMA parameter information; and map the uplink user data to the codeword of the selected codebook based on the selected codebook and the selected codeword quantity.

With reference to any one of the first to the fifth possible implementations of the third aspect, in a sixth possible implementation, the apparatus further includes:

a detection module, configured to: after the sending module sends the uplink user data and the selected pilot signal to the network-side device, detect a feedback message of the network-side device on a physical hybrid automatic repeat request indicator channel PHICH resource corresponding to the selected pilot signal, where the feedback message is used to feed back an ACK message indicating that the uplink user data of the UE is correctly received or a NACK message indicating that the uplink user data of the UE is not correctly received; and the sending module is further configured to:

retransmit the uplink user data after the detection module detects the non-acknowledgement NACK message.

With reference to the sixth possible implementation of the third aspect, in a seventh possible implementation, the selected codebook is a first codebook, and the sending module is specifically configured to retransmit the uplink user data in the following steps:

reselecting a second codebook different from the first codebook, mapping the uplink user data to a codeword of the second codebook, and reselecting, from the plurality of pilot signals indicated by the pilot signal parameter information, a pilot signal corresponding to the second codebook; and sending, to the network-side device on the time-frequency resource indicated by the random access response message, the uplink user data mapped to the codeword of the second codebook and the pilot signal corresponding to the second codebook.

With reference to the seventh possible implementation of the third aspect, in an eighth possible implementation, the sending module is specifically configured to:

reselect, from a plurality of codebooks that match a codeword length and a quantity of non-zero elements in a codeword that are corresponding to the first codebook, the second codebook different from the first codebook; or adjust a codeword length and/or a quantity of non-zero elements in a codeword that are/is corresponding to the first codebook, and reselect the second codebook from a plurality of codebooks that match an adjusted codeword length and/or an adjusted quantity of non-zero elements in a codeword.

According to a fourth aspect, an uplink transmission apparatus in random access is provided, including:

a sending module, configured to send pilot signal parameter information to UE within a coverage area, where the pilot signal parameter information is used to indicate a plurality of candidate pilot signals to the UE;

a detection module, configured to: detect a plurality of pilot signals on a time-frequency resource indicated by a sent random access response message, and transmit a detection result to a decoding module; and the decoding module, configured to: after the detection module detects the plurality of pilot signals, decode, based on the plurality of detected pilot signals, uplink user data sent by a plurality of user equipments UEs on the time-frequency resource.

With reference to the fourth aspect, in a first possible implementation, the decoding module is specifically configured to:

perform uplink channel estimation based on each detected pilot signal, and determine a codebook corresponding to the pilot signal; and decode, based on an uplink channel estimation result and the determined codebook, uplink user data corresponding to the pilot signal.

With reference to the first possible implementation of the fourth aspect, in a second possible implementation, the sending module is further configured to:

before the detection module detects the plurality of pilot signals, send sparse code multiple access SCMA parameter information to the UE within the coverage area, where the SCMA parameter information is used to indicate a plurality of candidate codebooks to the UE.

With reference to the second possible implementation of the fourth aspect, in a third possible implementation, the SCMA parameter information includes parameter information used to indicate one or more of the following information:

a codeword length of each candidate codebook;

a quantity of non-zero elements in a codeword of each candidate codebook; or a plurality of codeword quantities supported by each candidate codebook.

With reference to the second or the third possible implementation of the fourth aspect, in a fourth possible implementation, the detection module is specifically configured to:

determine, according to a random access preamble used by the UE and from the plurality of candidate codebooks indicated by the SCMA parameter information, at least one codebook corresponding to the random access preamble, where a codebook quantity of the at least one codebook is less than a quantity of the plurality of codebooks indicated by the SCMA parameter information; and detect, based on a pilot signal corresponding to each of the determined at least one codebook, the plurality of pilot signals on the time-frequency resource indicated by the sent random access response message.

With reference to the fourth aspect, in a fifth possible implementation, the decoding module is specifically configured to:

decode, based on the plurality of detected pilot signals and in a multi-UE multiple-input multiple-output MU-MIMO mode, the uplink user data sent by the plurality of UEs on the time-frequency resource.

With reference to any one of the fourth aspect, or the first to the fifth possible implementations of the fourth aspect, in a sixth possible implementation, the sending module is further configured to:

after the uplink user data is decoded, send feedback messages to the UEs on physical hybrid automatic repeat request indicator channel PHICH resources corresponding to the plurality of detected pilot signals, where the feedback message is used to feed back an ACK message indicating that the uplink user data of the UE is correctly received or a NACK message indicating that the uplink user data of the UE is not correctly received.

With reference to any one of the fourth aspect, or the first to the sixth possible implementations of the fourth aspect, in a seventh possible implementation, the plurality of UEs are in an idle state; and the sending module is further configured to:

after the decoding module successfully decodes the uplink user data sent by the plurality of UEs on the time-frequency resource, send a contention resolution message to the plurality of UEs in the idle state, where the contention resolution message includes indication information indicating that the uplink user data sent by the plurality of UEs in the idle state is decoded successfully and a cell radio network temporary identifier C-RNTI allocated to each UE in the idle state.

According to a fifth aspect, an uplink transmission device in random access is provided, including:

a processor, configured to: select, after determining that a random access response message sent by a network-side device is received, a pilot signal from a plurality of pilot signals indicated by pilot signal parameter information sent by a network-side device, and transmit the selected pilot signal and to-be-sent uplink user data to a transmitter; and the transmitter, configured to send, to the network-side device on a time-frequency resource indicated by the random access response message, the uplink user data and the selected pilot signal that are transmitted by the processor.

With reference to the fifth aspect, in a first possible implementation, the processor is further configured to:

before the transmitter sends the uplink user data and the selected pilot signal to the network-side device, select a codebook from a plurality of candidate codebooks indicated by sparse code multiple access SCMA parameter information sent by the network-side device, and map the uplink user data to a codeword of the selected codebook; and the transmitter is specifically configured to:

send, to the network-side device, the uplink user data mapped by the processor to the codeword and the selected pilot signal.

With reference to the first possible implementation of the fifth aspect, in a second possible implementation, the processor is specifically configured to:

select, from the plurality of pilot signals, a pilot signal corresponding to the selected codebook.

With reference to the first or the second possible implementation of the fifth aspect, in a third possible implementation, the processor is specifically configured to:

determine, according to a random access preamble used by user equipment UE and from the plurality of candidate codebooks indicated by the SCMA parameter information, at least one codebook corresponding to the random access preamble, where a codebook quantity of the at least one codebook is less than a quantity of the plurality of codebooks indicated by the SCMA parameter information; and select a codebook from the determined at least one codebook.

With reference to any one of the first to the third possible implementations of the fifth aspect, in a fourth possible implementation, the processor is specifically configured to:

determine, as the plurality of candidate codebooks indicated by the SCMA parameter information, a plurality of codebooks that match a codeword length and a quantity of non-zero elements in a codeword that are indicated by the SCMA parameter information.

With reference to any one of the first to the fourth possible implementations of the fifth aspect, in a fifth possible implementation, the processor is specifically configured to:

select, based on a size of the uplink user data, a codeword quantity from a plurality of codeword quantities supported by each candidate codebook indicated by the SCMA parameter information; and map the uplink user data to the codeword of the selected codebook based on the selected codebook and the selected codeword quantity.

With reference to any one of the first to the fifth possible implementations of the fifth aspect, in a sixth possible implementation, the device further includes:

a receiver, configured to: after the transmitter sends the uplink user data and the selected pilot signal to the network-side device, detect a feedback message of the network-side device on a physical hybrid automatic repeat request indicator channel PHICH resource corresponding to the selected pilot signal, where the feedback message is used to feed back an ACK message indicating that the uplink user data of the UE is correctly received or a NACK message indicating that the uplink user data of the UE is not correctly received; and the transmitter is further configured to:
retransmit the uplink user data after the receiver detects the non-acknowledgement NACK message.

With reference to the sixth possible implementation of the fifth aspect, in a seventh possible implementation, the selected codebook is a first codebook, and the transmitter is specifically configured to retransmit the uplink user data in the following steps:

reselecting a second codebook different from the first codebook, mapping the uplink user data to a codeword of the second codebook, and reselecting, from the plurality of pilot signals indicated by the pilot signal parameter information, a pilot signal corresponding to the second codebook; and sending, to the network-side device on the time-frequency resource indicated by the random access response message, the uplink user data mapped to the codeword of the second codebook and the pilot signal corresponding to the second codebook.

With reference to the seventh possible implementation of the fifth aspect, in an eighth possible implementation, the transmitter is specifically configured to:

reselect, from a plurality of codebooks that match a codeword length and a quantity of non-zero elements in a codeword that are corresponding to the first codebook, the second codebook different from the first codebook; or adjust a codeword length and/or a quantity of non-zero elements in a codeword that are/is corresponding to the first codebook, and reselect the second codebook from a plurality of codebooks that match an adjusted codeword length and/or an adjusted quantity of non-zero elements in a codeword.

According to a sixth aspect, an uplink transmission device in random access is provided, including:

a transmitter, configured to send pilot signal parameter information to UE within a coverage area, where the pilot signal parameter information is used to indicate a plurality of candidate pilot signals to the UE;

a receiver, configured to: detect a plurality of pilot signals on a time-frequency resource indicated by a sent random access response message, and transmit a detection result to a processor; and the processor, configured to: after the receiver detects the plurality of pilot signals, decode, based on the plurality of detected pilot signals, uplink user data sent by a plurality of user equipments UEs on the time-frequency resource.

With reference to the sixth aspect, in a first possible implementation, the processor is specifically configured to:

perform uplink channel estimation based on each detected pilot signal, and determine a codebook corresponding to the pilot signal; and decode, based on an uplink channel estimation result and the determined codebook, uplink user data corresponding to the pilot signal.

With reference to the first possible implementation of the sixth aspect, in a second possible implementation, the transmitter is further configured to:

before the processor detects the plurality of pilot signals, send sparse code multiple access SCMA parameter information to the UE within the coverage area, where the SCMA parameter information is used to indicate a plurality of candidate codebooks to the UE.

With reference to the second possible implementation of the sixth aspect, in a third possible implementation, the SCMA parameter information includes parameter information used to indicate one or more of the following information:

a codeword length of each candidate codebook;
a quantity of non-zero elements in a codeword of each candidate codebook; or
a plurality of codeword quantities supported by each candidate codebook.

With reference to the first or the third possible implementation of the sixth aspect, in a fourth possible implementation, the processor is specifically configured to:

determine, according to a random access preamble used by the UE and from the plurality of candidate codebooks indicated by the SCMA parameter information, at least one codebook corresponding to the random access preamble, where a codebook quantity of the at least one codebook is less than a quantity of the plurality of codebooks indicated by the SCMA parameter information; and detect, based on a pilot signal corresponding to each of the determined at least one codebook, the plurality of pilot signals on the time-frequency resource indicated by the sent random access response message.

With reference to the sixth aspect, in a fifth possible implementation, the processor is specifically configured to:

decode, based on the plurality of detected pilot signals and in a multi-UE multiple-input multiple-output MU-MIMO mode, the uplink user data sent by the plurality of UEs on the time-frequency resource.

With reference to any one of the sixth aspect, or the first to the fifth possible implementations of the sixth aspect, in a sixth possible implementation, the transmitter is further configured to:

after the uplink user data is decoded, send feedback messages to the UEs on physical hybrid automatic repeat request indicator channel PHICH resources corresponding to the plurality of detected pilot signals, where the feedback message is used to feed back an ACK message indicating that the uplink user data of the UE is correctly received or a NACK message indicating that the uplink user data of the UE is not correctly received.

With reference to any one of the sixth aspect, or the first to the sixth possible implementations of the sixth aspect, in a seventh possible implementation, the plurality of UEs are in an idle state; and the transmitter is further configured to:

after the processor successfully decodes the uplink user data sent by the plurality of UEs on the time-frequency resource, send a contention resolution message to the plurality of UEs in the idle state, where the contention resolution message includes indication information indicating that the uplink user data sent by the plurality of UEs in the idle state is decoded successfully and a cell radio network temporary identifier C-RNTI allocated to each UE in the idle state.

According to the method, the apparatus, or the device provided in any one of the foregoing aspects, the network-side device can indicate the plurality of pilot signals to the UE in advance; and after receiving the random access response message sent by the network-side device, the UE can select the pilot signal from the plurality of pilot signals, and send the uplink user data and the selected pilot signal to the network-side device on the time-frequency resource indicated by the random access response message. In this way, when a plurality of UEs send a same random access preamble to a base station on a same random access resource, a probability that the plurality of UEs use different pilot signals in msg3-s can be increased, so as to increase a success rate of contention-based random access procedures.

BRIEF DESCRIPTION OF DRAWINGS

FIG. 6(b) is a schematic diagram of a message body that is in the msg4 and corresponding to individual UE according to an embodiment of the present disclosure;

DESCRIPTION OF EMBODIMENTS

Figure 1:
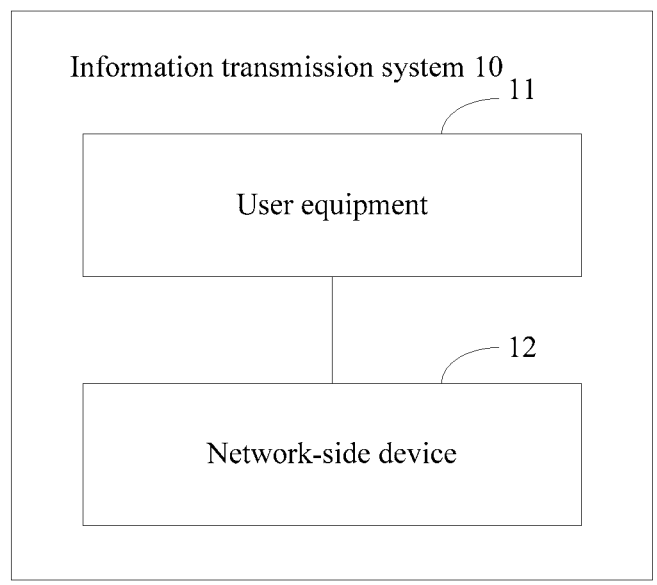
FIG. 1 is a schematic structural diagram of an uplink transmission system 10 in random access according to an embodiment of the present disclosure.

As shown in FIG. 1, FIG. 1 is a schematic structural diagram of an uplink transmission system 10 in random access according to an embodiment of the present disclosure. The system 10 includes:

user equipment UE 11, configured to: after receiving a random access response message sent by a network-side device 12, select a pilot signal from a plurality of pilot signals indicated by pilot signal parameter information sent by the network-side device, and send uplink user data and the selected pilot signal to the network-side device on a time-frequency resource indicated by the random access response message; and the network-side device 12, configured to: send pilot signal parameter information to UE within a coverage area, where the pilot signal parameter information is used to indicate a plurality of candidate pilot signals to the UE; detect the plurality of pilot signals on the time-frequency resource indicated by the sent random access response message; and decode, after detecting the plurality of pilot signals and based on the plurality of detected pilot signals, uplink user data sent by a plurality of user equipments UEs on the time-frequency resource.

The following further details the embodiments of the present disclosure with reference to the accompanying drawings in this specification.

Embodiment 1

Figure 2:
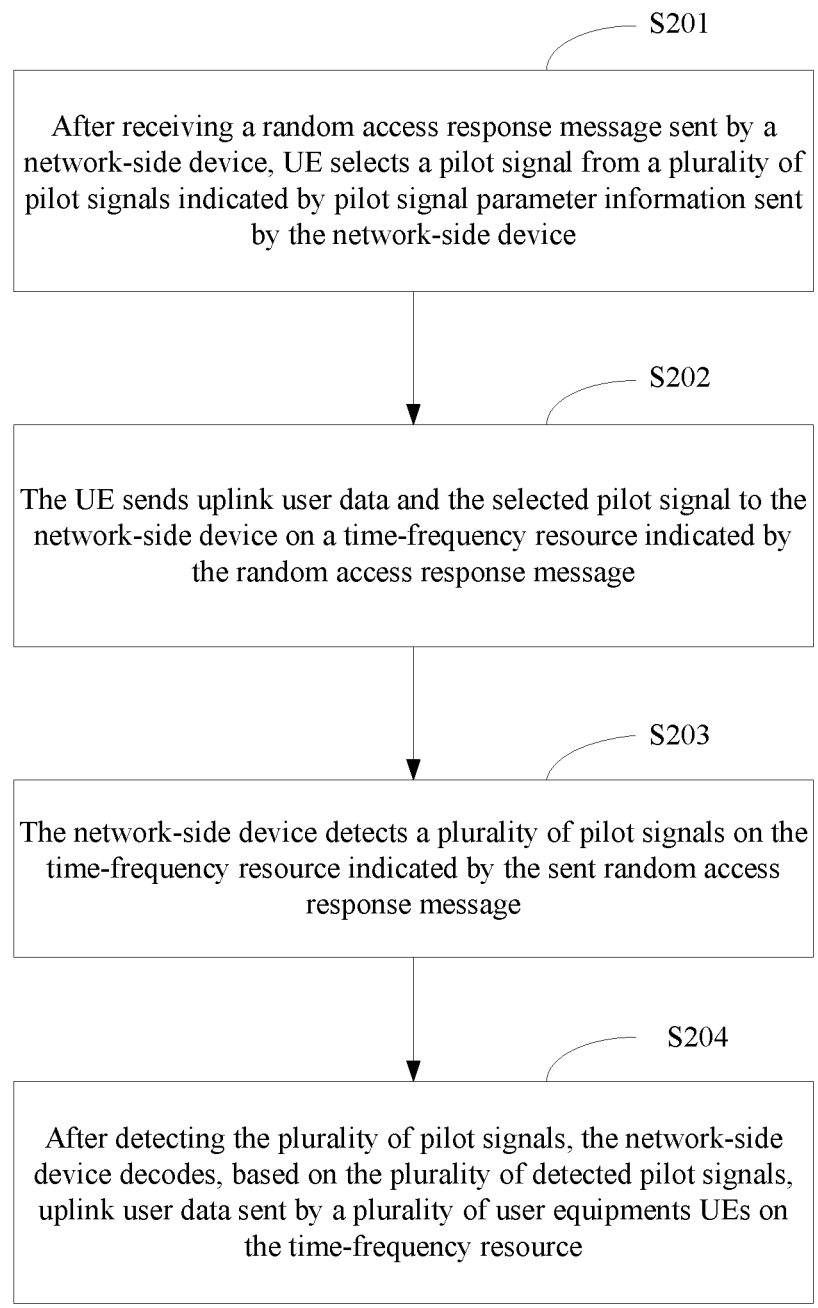
FIG. 2 is a flowchart of an uplink transmission method in random access according to Embodiment 1 of the present disclosure.

As shown in FIG. 2, FIG. 2 is a flowchart of an uplink transmission method in random access according to Embodiment 1 of the present disclosure. The method includes the following steps.

S201. After receiving a random access response message sent by a network-side device, UE selects a pilot signal from a plurality of pilot signals indicated by pilot signal parameter information sent by the network-side device.

During specific implementation, when initiating random access, the UE sends a random access preamble to the network-side device (which may be specifically a base station); after detecting the random access preamble, the network-side device feeds back the random access response message; and after receiving the random access response message, the UE sends uplink user data and a pilot signal (that is, a msg3). To reduce collisions and increase a random access success rate, in this embodiment of the present disclosure, a plurality of pilot signals are allocated for the msg3, and UE can select one of the plurality of pilot signals, as a pilot signal for the msg3.

Herein, the network-side device may send the pilot signal parameter information to the UE by using a broadcast message or dedicated signaling. The pilot signal parameter information may include pilot signal configuration information (including a cyclic shift, a time-domain extension code, and the like of each pilot signal) of the plurality of pilot signals or pilot index numbers of the plurality of pilot signals. Each pilot index number is corresponding to one pilot signal. The pilot signal parameter information may be a pilot index group number, and one pilot index group number is corresponding to one group of pilot signals (for details, refer to descriptions of Embodiment 2).

S202. The UE sends uplink user data and the selected pilot signal to the network-side device on a time-frequency resource indicated by the random access response message.

Herein, the UE sends, by adding the selected pilot signal and the uplink user data to the msg3, the selected pilot signal and the uplink user data to the network-side device on a time-frequency resource indicated by a UL-grant in the random access response message.

S203. The network-side device detects a plurality of pilot signals on the time-frequency resource indicated by the sent random access response message.

S204. After detecting the plurality of pilot signals, the network-side device decodes, based on the plurality of detected pilot signals, uplink user data sent by a plurality of user equipments UEs on the time-frequency resource.

During specific implementation, the network-side device performs blind pilot signal detection on the time-frequency resource indicated by the random access response message to the UE; and if detecting only one pilot signal, the network-side device may directly perform channel estimation based on the pilot signal, and decode, based on a channel estimation result, the uplink user data received on the time-frequency resource. If a plurality of pilot signals are detected, it indicates that the plurality of UEs have all sent uplink user data on the time-frequency resource, and the network-side device may decode, by using a channel multiplexing technology, the uplink user data sent by the plurality of UEs on the time-frequency resource. Herein, the channel multiplexing technology used by the network-side device may be a sparse code multiple access (SCMA) technology or a multi-user multiple-input multiple-output technology (MU-MIMO). The following describes SCMA-based uplink user data transmission in a random access procedure by using Embodiment 2 and describes MU-MIMO-based uplink user data transmission in a random access procedure by using Embodiment 3.

Based on the foregoing description, it can be learned that sending the msg3 in a random access procedure is improved in this embodiment of the present disclosure. The network-side device can indicate the plurality of pilot signals to the UE in advance, and when the UE needs to send the msg3, the UE can select, from the plurality of pilot signals, a pilot signal to be carried in the msg3. In this way, even when a plurality of UEs send a same random access preamble in msg1-s to a base station on a same random access resource, a probability that the plurality of UEs use different pilot signals in msg3-s can still be increased, so as to increase a success rate of contention-based random access procedures.

Embodiment 2

Figure 3:
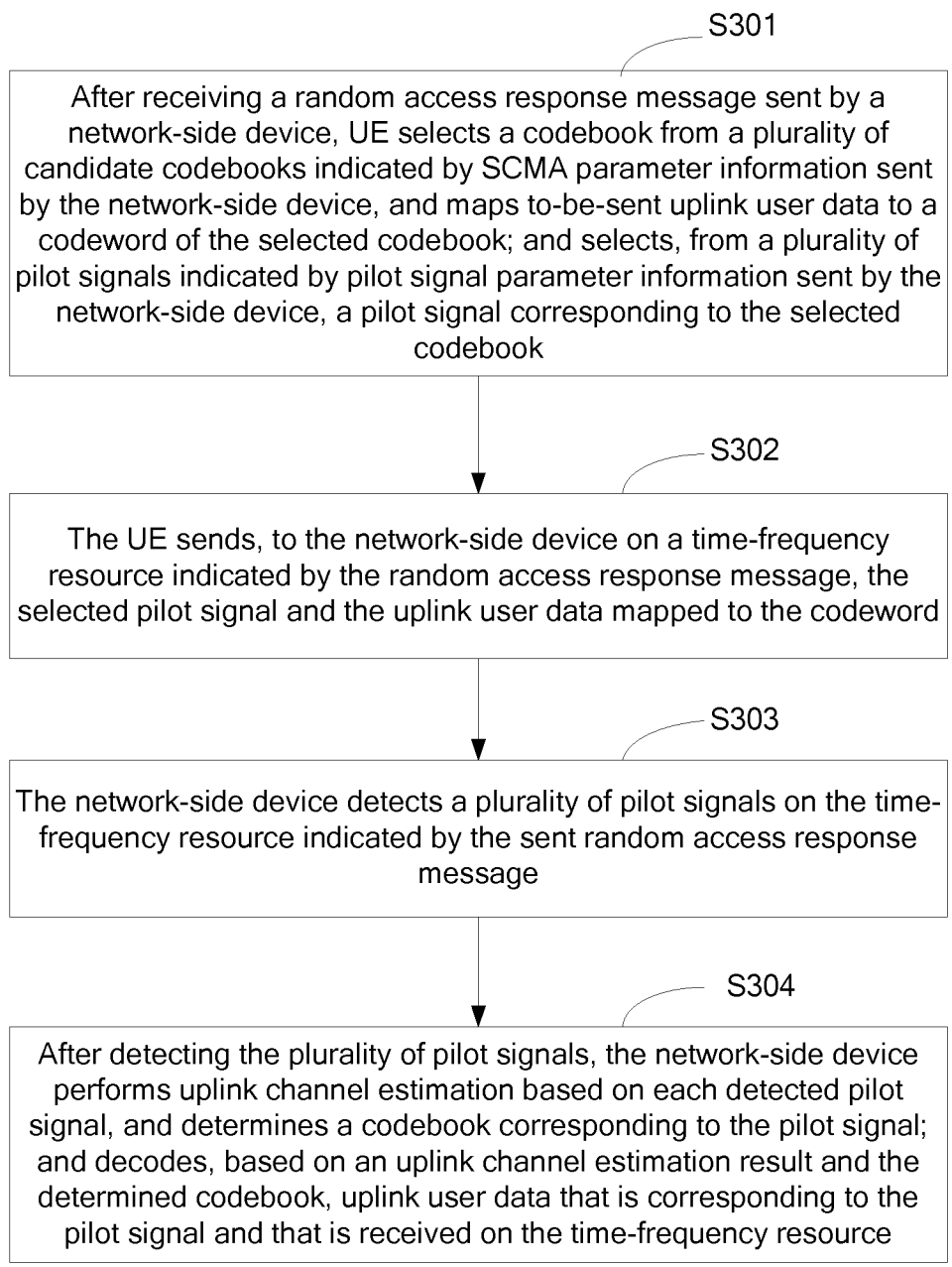
FIG. 3 is a flowchart of an uplink transmission method in random access according to Embodiment 2 of the present disclosure.

As shown in FIG. 3, FIG. 3 is a flowchart of an uplink transmission method in random access according to Embodiment 2 of the present disclosure. The method includes the following steps.

S301. After receiving a random access response message sent by a network-side device, UE selects a codebook from a plurality of candidate codebooks indicated by SCMA parameter information sent by the network-side device, and maps to-be-sent uplink user data to a codeword of the selected codebook; and selects, from a plurality of pilot signals indicated by pilot signal parameter information sent by the network-side device, a pilot signal corresponding to the selected codebook.

Herein, each codebook is corresponding to one or more pilot signals, and each pilot signal is corresponding to one codebook.

In a specific implementation process, the network-side device may send, to the UE by using a broadcast message or dedicated signaling, the SCMA parameter information indicating the plurality of candidate codebooks and the pilot signal parameter information. The broadcast message may be specifically a master information block (MIB) message or a system information block (SIB) message. When the SCMA parameter information and the pilot signal parameter information are sent in an MIB, 10 bits that are currently idle in the MIB may be occupied. When the SCMA parameter information and the pilot signal parameter information are sent in an SIB, a corresponding field may be added to the current SIB.

The following describes the SCMA parameter information and the pilot signal parameter information separately.

1. SCMA parameter information:

The SCMA parameter information may be an SCMA configuration index number, and each SCMA configuration index number is corresponding to a known SCMA configuration. Alternatively, the SCMA parameter information may include specific configuration information, for example, a codeword length K of each candidate codebook, a quantity N of non-zero elements in a codeword of each candidate codebook, different codeword quantities supported by each candidate codebook (for example, two codeword quantities M1 and M2 that are supported), as listed in Table 1.

TABLE 1

| SCMA configuration index number | Codeword length K | Quantity N of non-zero elements in a codeword | Codebook quantity | Codeword quantity M1 | Codeword quantity M2 |
| --- | --- | --- | --- | --- | --- |
| 0 | 4 | 2 | 6 | 4 | 8 |
| 1 | 6 | 2 | 15 | 4 | 8 |
| 2 | 6 | 3 | 20 | 4 | 8 |
| 3 | 8 | 2 | 28 | 8 | 16 |

For example, the SCMA parameter information sent by the network-side device indicates an SCMA configuration index number of 0. In this case, an available SCMA configuration that can be obtained by UE receiving the SCMA parameter information is as follows: A code length is 4, a quantity of non-zero elements in a codeword is 2, a quantity of available codebooks is Chd $4^2$=6, and each codebook supports two codeword quantities: 4 and 8.

During specific implementation, the UE may determine, as the plurality of codebooks indicated by the SCMA parameter information, a plurality of codebooks that mach the codeword length K and the quantity N of non-zero elements in a codeword that are indicated by the SCMA parameter information (N<K). For example, a codeword length is 4, a quantity of non-zero elements in a codeword is 2, and two element positions from four element positions are selected as non-zero element positions. In this way, there are six selection manners in total, and each selection manner is corresponding to one codebook.

Because each codeword is corresponding to one type of data bit combination, a codeword quantity of a codebook is equal to types of data bit combinations, that is, different codeword quantities are corresponding to different data sizes. For example, for 2 bits of data, there are four data bit combinations, which are (1,0), (1,1), (0,0), and (1,1). To map the 2 bits of data to a codeword, a codebook needs to support a codeword quantity 4.

Figure 4:
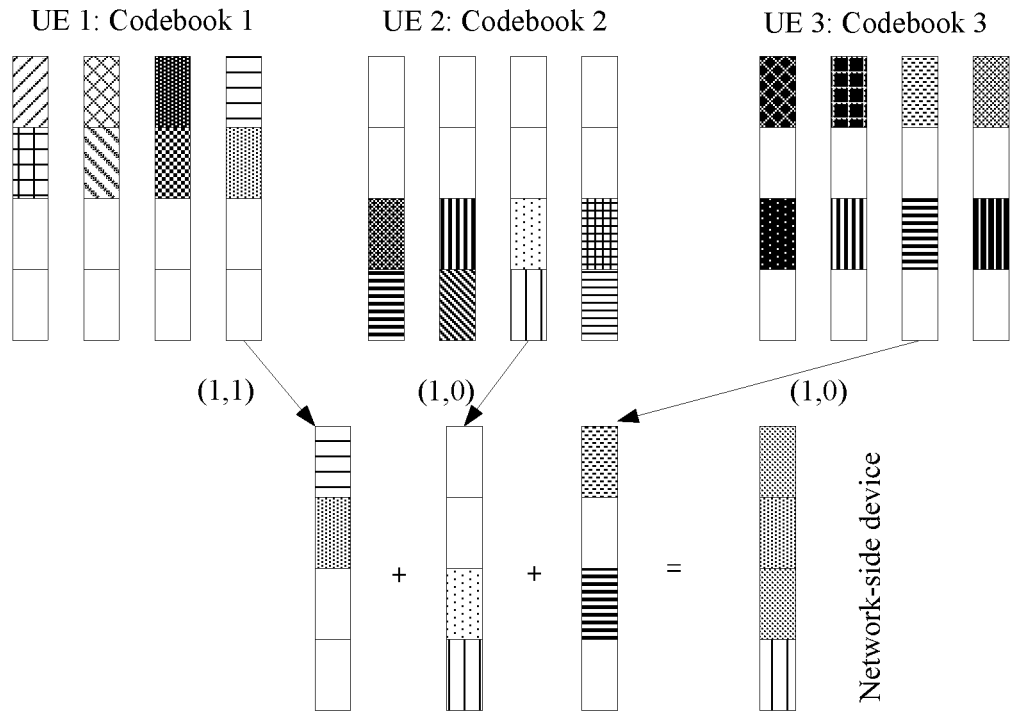
FIG. 4 is a schematic diagram in which a plurality of UEs map, to codewords by using different codebooks, uplink user data that is to be sent by the plurality of UEs, and send the codewords to a network-side device on a same time-frequency resource.

Based on the foregoing description, when mapping the to-be-sent uplink user data to the codeword of the selected codebook, the UE may select, based on a size of the uplink user data, a codeword quantity from a plurality of codeword quantities supported by each candidate codebook indicated by the SCMA parameter information, and map the uplink user data to the codeword of the selected codebook based on the selected codebook and the selected codeword quantity. As shown in FIG. 4, FIG. 4 is a schematic diagram in which a plurality of UEs map, to codewords by using different codebooks, uplink user data that is to be sent by the plurality of UEs, and send the codewords to the network-side device on a same time-frequency resource.

In such a manner in which each codebook supports different codeword quantities, based on the size of the to-be-sent uplink user data, an actually required codeword quantity may be selected for mapping. In this way, uplink user data of different sizes can be transmitted by using the different codeword quantities. The time-frequency resource indicated by the random access response message by the network-side device may be a preset resource block (RB) quantity. Therefore, there is no need to indicate different RB quantities to satisfy a transmission requirement of the uplink user data of different sizes, and signaling overhead is reduced.

In an implementation, to reduce complexity of blind pilot signal detection by the network-side device in S203, the random access preamble sent by the UE in the msg1 may be associated with an available codebook.

Specifically, the UE determines, according to the used random access preamble and from the plurality of candidate codebooks indicated by the SCMA parameter information, at least one codebook corresponding to the random access preamble, where a codebook quantity of the at least one codebook is less than a quantity of the plurality of codebooks indicated by the SCMA parameter information; and select a codebook from the determined at least one codebook.

In a specific implementation process, at least one codebook corresponding to each random access preamble may be preconfigured in each SCMA configuration. After the network-side device sends an SCMA configuration index number to the UE, the UE can determine, from a plurality of codebooks indicated by the SCMA configuration index number, the at least one codebook corresponding to the random access preamble used by the UE.

2. Pilot Signal Parameter Information:

Because the network-side device needs to perform uplink channel estimation before decoding the uplink user data sent by the UE, in addition to the uplink user data, the msg3 sent by the UE to the network-side device needs to carry a pilot signal. In Embodiment 2 of the present disclosure, the UE maps the uplink user data to the codeword of the selected codebook based on the selected codebook. To enable the network-side device to decode the uplink user data of the plurality of UEs correctly, each codebook needs to have a corresponding pilot signal. Each codebook may be corresponding to one or more pilot signals, but each pilot signal is corresponding to only one codebook.

As listed in Table 2, to ensure channel estimation performance, during specific implementation, available pilot signals may be divided into three groups according to a cyclic shift and a time-domain extension code of a pilot signal. Each group has eight pilot signals, different groups of pilot signals use different cyclic shifts, and pilot signals in a same group are corresponding to different cyclic shifts and/or time-domain extension codes. When an available pilot signal is indicated to the UE, one of the three groups of pilot signals are indicated to the UE. In Table 2, pilot index numbers 0 to 7 are corresponding to a first group of pilot signals, pilot index numbers 8 to 15 are corresponding to a second group of pilot signals, and pilot index number 16 to 23 are corresponding to a third group of pilot signals. During specific implementation, each pilot signal may have a pilot index group number, and the UE may be notified of only the pilot index group number, to indicate to the UE that a group of pilot signals corresponding to the pilot index group number are available pilot signals.

During specific implementation, a correspondence between a pilot signal and a codebook may be preconfigured for each SCMA configuration. When a quantity of available codebooks is less than a quantity of available pilot signals (for example, the quantity of available codebooks is 6, and the quantity of available pilot signals is 8) in any SCMA configuration, different pilot signals may be corresponding to one codebook.

TABLE 2

| Pilot index number | Cyclic shift ($n_{DMRS,\lambda}^{(2)}$) | Time-domain extension code $[w^{(\lambda)}(0)\ w^{(\lambda)}(1)]$ |
|---|---|---|
| 0 | 0 | [1, 1] |
| 1 | 6 | [1, 1] |
| 2 | 3 | [1, 1] |
| 3 | 9 | [1, 1] |
| 4 | 0 | [1, −1] |
| 5 | 6 | [1, −1] |
| 6 | 3 | [1, −1] |
| 7 | 9 | [1, −1] |
| 8 | 2 | [1, 1] |
| 9 | 8 | [1, 1] |
| 10 | 5 | [1, 1] |
| 11 | 11 | [1, 1] |
| 12 | 2 | [1, −1] |
| 13 | 8 | [1, −1] |
| 14 | 5 | [1, −1] |
| 15 | 11 | [1, −1] |
| 16 | 4 | [1, 1] |
| 17 | 10 | [1, 1] |
| 18 | 7 | [1, 1] |
| 19 | 1 | [1, 1] |
| 20 | 4 | [1, −1] |
| 21 | 10 | [1, −1] |
| 22 | 7 | [1, −1] |
| 23 | 1 | [1, −1] |

S302. The UE sends, to the network-side device on a time-frequency resource indicated by the random access response message, the selected pilot signal and the uplink user data mapped to the codeword.

Herein, the UE sends the msg3 on a time-frequency resource indicated by a UL-grant in the random access response message. The msg3 carries the uplink user data mapped to the codeword and a pilot signal used to decode the uplink user data.

S303. The network-side device detects a plurality of pilot signals on the time-frequency resource indicated by the sent random access response message.

In a specific implementation process, the network-side device may perform, according to pilot signals corresponding to the plurality of candidate codebooks indicated by the SCMA parameter information to the UE, blind pilot signal detection on the time-frequency resource indicated by the random access response message.

It has been described in S301 that, to reduce the complexity of blind pilot signal detection, the random access preamble used by the UE may be associated with a codebook. In each SCMA configuration, each random access preamble is corresponding to a group of codebooks, and a codebook quantity of the group of codebooks is less than a total codebook quantity in this SCMA configuration. The network-side device determines, according to the random access preamble used by the UE and from the plurality of candidate codebooks indicated by the SCMA parameter information, at least one codebook corresponding to the random access preamble, and detects, based on a pilot signal corresponding to each of the determined at least one codebook, the pilot signals on the time-frequency resource indicated by the sent random access response message.

S304. After detecting the plurality of pilot signals, the network-side device performs uplink channel estimation based on each detected pilot signal, and determines a codebook corresponding to the pilot signal; and decodes, based on an uplink channel estimation result and the determined codebook, uplink user data that is corresponding to the pilot signal and that is received on the time-frequency resource.

Herein, after detecting the plurality of pilot signals, the network-side device performs uplink channel estimation on each pilot signal, and decodes, based on an uplink channel estimation result, uplink user data corresponding to the pilot signal (uplink user data transmitted together with the pilot signal in the msg3), that is, detects, in the uplink user data, a codeword of a codebook corresponding to the pilot signal.

During specific implementation, if the network-side device detects a plurality of pilot signals on a same time-frequency resource indicated by a random access response message (that is, a msg2) to the UE, it indicates that a plurality of UEs have sent uplink user data on the time-frequency resource. After successfully decoding the uplink user data sent by the plurality of UEs, the network-side device may send a contention resolution message (a msg4) to the plurality of UEs. When the plurality of UEs are UEs in an RRC connected state, a message structure of the msg4 does not change. When the plurality of UEs include a plurality of UEs in an idle state, for the plurality of UEs in the idle state, the msg4 needs to include indication information indicating that uplink user data sent by the plurality of UEs in the idle state is decoded successfully. The indication information may be the uplink user data sent by the plurality of UEs in the idle state. The msg4 further includes a cell radio network temporary identity (C-RNTI) allocated to each of the plurality of UEs in the idle state. Herein, the C-RNTIs allocated to the plurality of UEs in the idle state are usually different from a temporary C-RNTI allocated in the msg2. Optionally, a C-RNTI that is the same as the temporary C-RNTI indicated by the msg2 may be allocated to specific UE in the plurality of UEs in the idle state. In this case, the C-RNTI of the UE may be indicated, in the msg4, to be the prior temporary C-RNTI. Alternatively, the C-RNTI of the UE is not indicated by the msg4. In this case, the network-side device considers that the C-RNTI of the UE is the prior temporary C-RNTI by default.

Figure 5A:
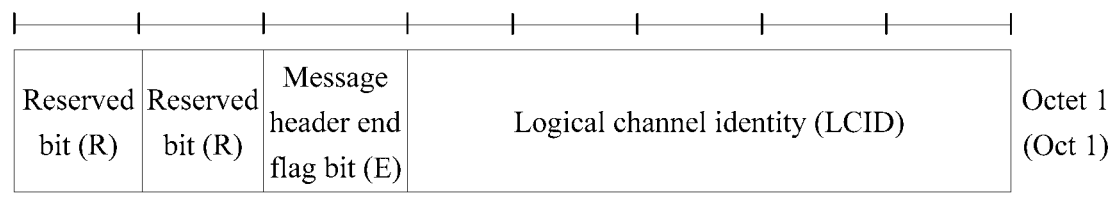
FIG. 5(a) is a schematic diagram of a message format of a MAC message header in a prior msg4.
Figure 5B:
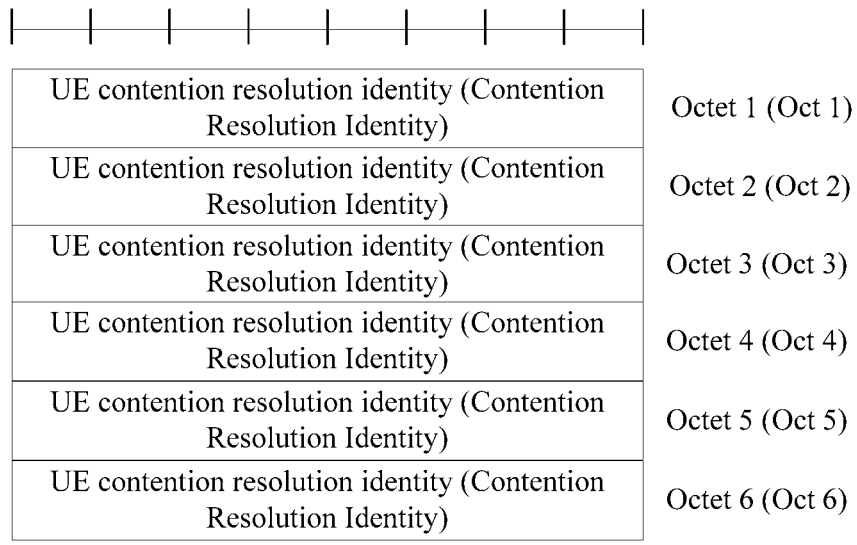
FIG. 5(b) is a schematic diagram of a message format of a MAC message body in a prior msg4.

As shown in FIG. 5(a) and FIG. 5(b), FIG. 5(a) and FIG. 5(b) are schematic diagrams of message formats of a Medium Access Control (MAC) message header and message body in a prior msg4, respectively. The MAC message header of the msg4 includes a reserved bit (R), a message header end flag bit (E), and a logical channel identifier that occupies one octet (Oct 1). The MAC message body of the msg4 is a CCCH-SDU, that is, uplink user data added to the msg3 by UE: UE contention resolution identity is 48 bits in total and occupies six octets (which are Oct 1 to Oct 6, respectively).

Figure 6A:
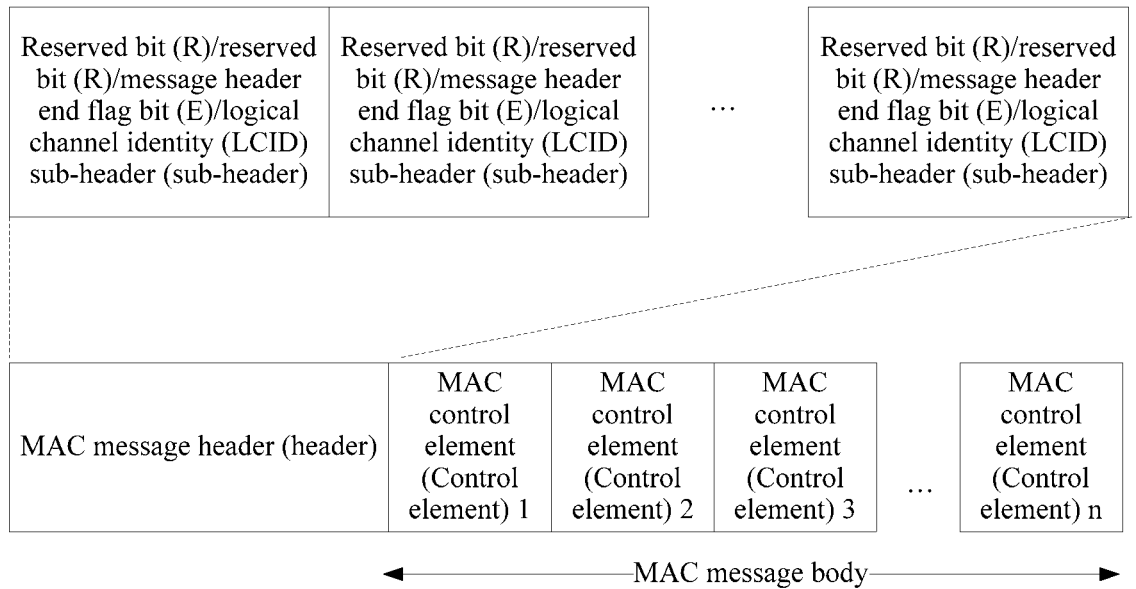
FIG. 6(a) is a schematic diagram of a message format of the msg4 according to an embodiment of the present disclosure.

As shown in FIG. 6(a) and FIG. 6(b), FIG. 6(a) and FIG. 6(b) are, respectively, a schematic diagram of a message format of a msg4 according to an embodiment of the present disclosure and a schematic diagram of a message format of a message body that is in a msg4 and corresponding to individual UE. In the embodiments of the present disclosure, the msg4 carries contention resolution messages of a plurality of UEs in an RRC idle state. This is equivalent that contention resolution messages of individual UEs are combined together. An element setting of the MAC message header is the same as an element setting of a MAC message header corresponding to individual UE. The MAC message body (that is, a MAC payload) includes a MAC control element for each UE, that is, includes message body information for each UE. As shown in FIG. 6(b), in the message body information for each UE, compared with a prior element setting, C-RNTI indication information needs to be added, adding 2 octets (Oct 7 and Oct 8).

A hybrid automatic repeat request (HARQ) mechanism is enabled as follows:

In this embodiment of the present disclosure, a HARQ procedure may be supported for transmission of the msg3. Specifically, the network-side device sends a feedback message to the UE on a physical hybrid automatic repeat request indicator channel (PHICH) resource corresponding to the detected pilot signal. The feedback message is used to feed back an acknowledgement (ACK) message indicating that the uplink user data of the UE is correctly received or a non-acknowledgement (NACK) message indicating that the uplink user data of the UE is not correctly received. Correspondingly, after sending the uplink user data and the selected pilot signal to the network-side device, the UE detects the feedback message of the network-side device on the PHICH resource corresponding to the selected pilot signal. After detecting the ACK message, the UE may determine that the msg3 is sent successfully, and prepare to receive the msg4; or after detecting the NACK message, retransmit the uplink user data.

Optionally, the selected codebook is a first codebook, and the retransmitting, by the UE, the uplink user data includes:

reselecting, by the UE, a second codebook different from the first codebook, mapping the uplink user data to a codeword of the second codebook, and reselecting, from the plurality of pilot signals indicated by the pilot signal parameter information, a pilot signal corresponding to the second codebook; and sending, to the network-side device on the time-frequency resource indicated by the random access response message, the uplink user data mapped to the codeword of the second codebook and the pilot signal corresponding to the second codebook.

Herein, there may be two manners for selecting the second codebook by the UE.

Manner 1: The codeword length K and the quantity N of non-zero elements in a codeword are not changed, and only the codebook is changed.

In this manner, the UE reselects, from a plurality of codebooks that match a codeword length and a quantity of non-zero elements in a codeword that are corresponding to the first codebook, the second codebook different from the first codebook.

In the manner 1, the UE does not change magnitudes of the used K and N, and selects the second codebook in an SCMA configuration indicated by a prior SCMA configuration index number, as listed in Table 1. In this way, a frequency-domain diversity effect can be obtained.

Manner 2: The codeword length K and/or the quantity N of non-zero elements in a codeword are/is changed.

In this manner, the UE adjusts a codeword length and/or a quantity of non-zero elements in a codeword that are/is corresponding to the first codebook, and reselects the second codebook from a plurality of codebooks that match an adjusted codeword length and/or an adjusted quantity of non-zero elements in a codeword.

In the manner 2, the UE may increase a value of K, a value of N, or values of K and N. An increase in the value of K can obtain greater data sparsity and reduce a collision probability, whereas an increase in the value of N can obtain a higher multidimensional codeword gain (also referred to as a spread spectrum gain).

In a specific implementation process, the network-side device may send HARQ parameter information to the UE, to indicate a retransmission mode used by the UE. Specifically, the HARQ parameter information may be sent together with the SCMA parameter information and the pilot parameter information. For example, 1 bit may be used as a retransmission mode flag ReModeFlag. ReModeFlag=0 may indicate that the UE is to use the manner 1, that is, to change only the used codebook but not the values of K and N. ReModeFlag=1 may indicate that the UE is to use the manner 2, that is, to adjust the values of K and N. A specific rule of changing the values of K and N may be preset. For example, the values of K and N may be changed based on descending order of SCMA configuration index numbers. For example, an SCMA configuration index number corresponding to an SCMA configuration used for transmission that last fails is 0. In this case, an SCMA configuration corresponding to an SCMA configuration index number of 1 is used for this retransmission, as listed in Table 1.

By using Embodiment 2 of the present disclosure, each UE randomly selects a codebook from available codebooks and maps the to-be-sent uplink user data to a codeword, selects a pilot signal corresponding to the selected codebook, and sends the uplink user data mapped to the codeword and the pilot signal together to the network-side device by adding the uplink user data and the pilot signal to a msg3. After detecting a plurality of pilot signals, the network-side device decodes, based on a codebook corresponding to each pilot signal, uplink user data corresponding to the pilot signal. This improves a capability of detecting msg3-s sent by a plurality of UEs on a same time-frequency resource, and further improves a random access success rate.

In addition, in Embodiment 2 of the present disclosure, each codebook may support different codeword quantities, and the UE may select a codeword quantity according to a size of uplink user data that needs to be transmitted in the msg3. In this way, an indication of an RB quantity in a UL-grant in the msg2 by the network-side device can be reduced, and signaling overhead is reduced.

In addition, the HARQ mechanism may be supported in Embodiment 2 of the present disclosure. During retransmission, the UE may not change the codeword length K and the quantity N of non-zero elements, and change only the used codebook. In this way, a frequency-domain diversity gain can be obtained. Alternatively, the UE may increase a magnitude/magnitudes of the codeword length K and/or the quantity N of non-zero elements, to achieve a smaller collision probability and/or a higher multidimensional codeword gain and improve system transmission performance.

Embodiment 3

Figure 7:
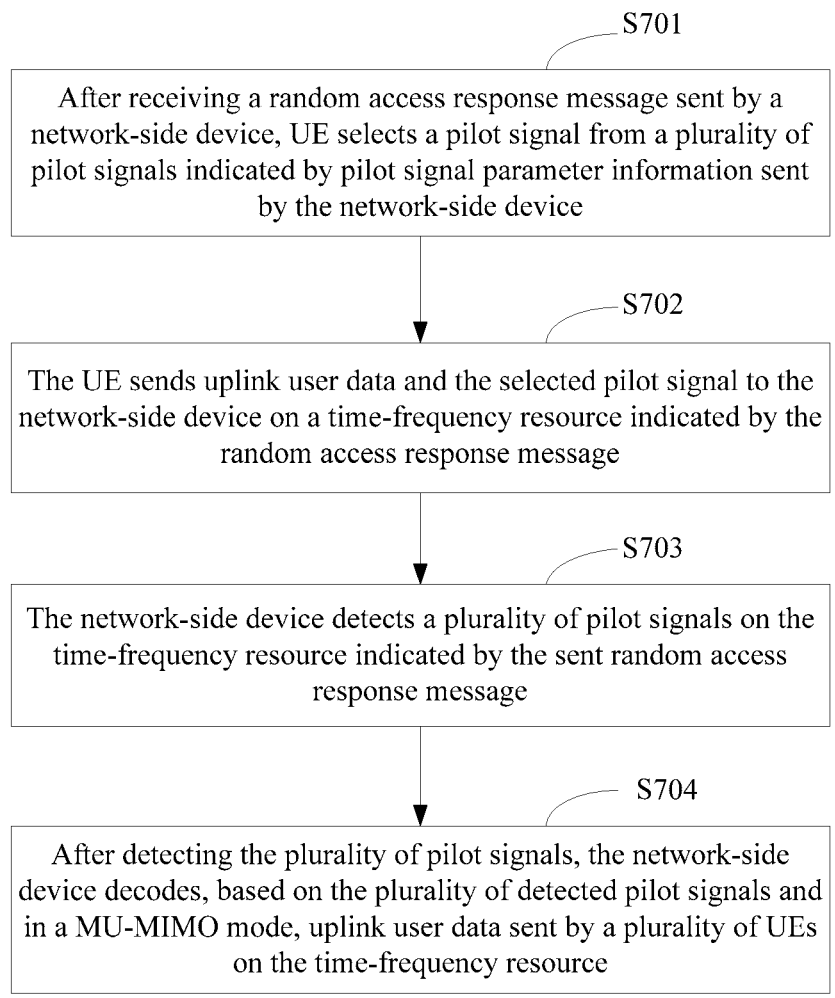
FIG. 7 is a flowchart of an uplink transmission method in random access according to Embodiment 3 of the present disclosure.

As shown in FIG. 7, FIG. 7 is a flowchart of an uplink transmission method in random access according to Embodiment 3 of the present disclosure. In this embodiment, msg3-s sent by a plurality of UEs on a same time-frequency resource are detected by using an MU-MIMO technology. The method includes the following steps.

S701. After receiving a random access response message sent by a network-side device, UE selects a pilot signal from a plurality of pilot signals indicated by pilot signal parameter information sent by the network-side device.

During specific implementation, the network-side device may send the pilot signal parameter information to UE within a coverage area by using a broadcast message or dedicated signaling. For an implementation form of the pilot signal parameter information, refer to the descriptions of Embodiment 2. For example, a pilot index group number is used to indicate that the UE is capable of using a group of pilot signals. Details are not described herein again. After receiving the msg2, the UE randomly selects, from the plurality of pilot signals indicated by the network-side device, a pilot signal as a pilot signal carried in the msg3.

S702. The UE sends uplink user data and the selected pilot signal to the network-side device on a time-frequency resource indicated by the random access response message.

Herein, the UE sends the msg3 to the network-side device. The msg3 carries the uplink user data and a pilot signal used for the network-side device to perform uplink channel estimation.

S703. The network-side device detects a plurality of pilot signals on the time-frequency resource indicated by the sent random access response message.

In this step, the network-side device performs blind pilot signal detection on the time-frequency resource indicated by the random access response message. Specifically, the network-side device may sequentially detect, based on a group of pilot signals sent to the UE, whether a pilot signal in the group of pilot signals exists in the msg3.

Optionally, a random access preamble used by the UE may be associated with a pilot signal that may be used by the UE. In this way, only a pilot signal associated with a previously received random access preamble needs to be detected when blind pilot signal detection is performed. For example, a correspondence between each random access preamble and a pilot signal set may be specified. A quantity of pilot signals in the pilot signal set is less than a quantity of pilot signals indicated by the sent pilot signal parameter information. During specific implementation, the correspondence between each random access preamble and a pilot signal set (including some pilot signals in the group of pilot signals) may be specified for each group of pilot signals listed in Table 2.

S704. After detecting the plurality of pilot signals, the network-side device decodes, based on the plurality of detected pilot signals and in an MU-MIMO mode, uplink user data sent by a plurality of UEs on the time-frequency resource.

In a specific implementation process, the network-side device may detect one or more pilot signals. If detecting only one pilot signal, the network-side device may directly perform uplink channel estimation based on the pilot signal, and decode, based on an uplink channel estimation result, uplink user data corresponding to the pilot signal. If detecting a plurality of pilot signals, the network-side device performs decoding in the MU-MIMO mode.

In Embodiment 3, a HARQ procedure may also be supported. Specifically, the network-side device sends a feedback message to the UE on a PHICH resource corresponding to a detected pilot signal. The feedback message is used to indicate whether the uplink user data is transmitted successfully. Correspondingly, after sending the uplink user data and the selected pilot signal to the network-side device, the UE detects the feedback message of the network-side device on a PHICH resource corresponding to the selected pilot signal; and retransmits the uplink user data after detecting a NACK message. In this case, the UE may reselect a pilot signal from available pilot signals and initiate retransmission.

Optionally, the plurality of UEs are in an idle state; and after the network-side device successfully decodes the uplink user data sent by the plurality of UEs on the time-frequency resource, the method further includes:

sending, by the network-side device, a contention resolution message to the plurality of UEs in the idle state, where the contention resolution message includes indication information indicating that the uplink user data sent by the plurality of UEs in the idle state is decoded successfully and a cell radio network temporary identifier C-RNTI allocated to each UE in the idle state.

During specific implementation, when the network-side device detects, in the msg3, data of the plurality of UEs in an RRC idle state, the network-side device needs to add, to the msg4 sent to the plurality of UEs in the idle state, the indication information indicating that the uplink user data sent by the plurality of UEs in the idle state is decoded successfully and the C-RNTI allocated to each UE in the idle state. The indication information may be a CCCH SDU of the plurality of UEs in the idle state. That is, in this embodiment of the present disclosure, a MAC message format of the msg4 is changed, and the msg4 no longer includes only data of individual UE. This design manner is not limited to the foregoing SCMA or MU-MIMO multiplexing manner. After msg3 data of the plurality of UEs in the idle state is detected by using another multiplexing manner, this msg4 message format may also be used.

By using Embodiment 3 of the present disclosure, a probability that the plurality of UEs use different pilot signals in msg3-s is increased. After detecting the plurality of pilot signals, the network-side device may decode, based on the plurality of detected pilot signals and in the MU-MIMO mode, the uplink user data sent by the plurality of UEs on the same time-frequency resource. Therefore, a success rate of random access procedures can be increased.

Based on the same inventive concept, an embodiment of the present disclosure further provides an uplink transmission apparatus in random access corresponding to the uplink transmission method in random access. Because a principle of resolving a problem by the apparatus is similar to that of the uplink transmission method in random access in the embodiments of the present disclosure, for implementation of the apparatus, refer to the implementation of the method. Repeated information is omitted herein.

Embodiment 4

Figure 8:
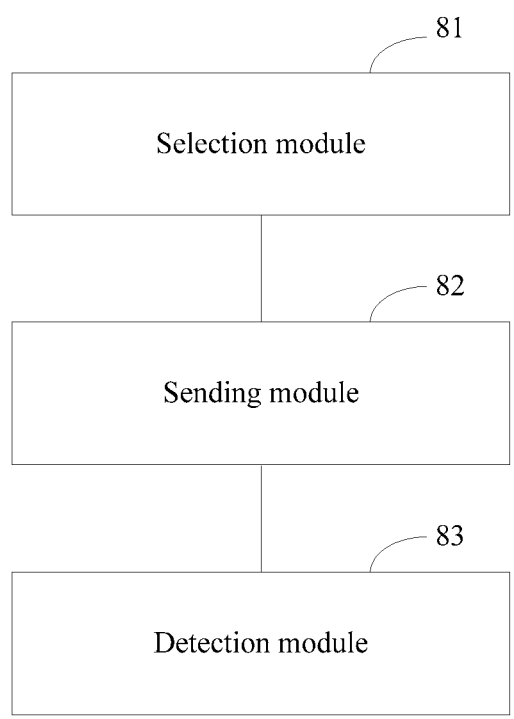
FIG. 8 is a schematic structural diagram of an uplink transmission apparatus in random access according to Embodiment 4 of the present disclosure.

As shown in FIG. 8, FIG. 8 is a schematic structural diagram of an uplink transmission apparatus in random access according to Embodiment 4 of the present disclosure. The apparatus includes:

a selection module 81, configured to: after a random access response message sent by a network-side device is received, select a pilot signal from a plurality of pilot signals indicated by pilot signal parameter information sent by the network-side device, and transmit the selected pilot signal to a sending module 82; and the sending module 82, configured to send uplink user data and the selected pilot signal to the network-side device on a time-frequency resource indicated by the random access response message.

Optionally, the selection module 81 is further configured to:

before the sending module 82 sends the uplink user data and the selected pilot signal to the network-side device, select a codebook from a plurality of candidate codebooks indicated by sparse code multiple access SCMA parameter information sent by the network-side device, and map the uplink user data to a codeword of the selected codebook; and the sending module 82 is specifically configured to:

send, to the network-side device, the selected pilot signal and the uplink user data mapped to the codeword.

Optionally, the selection module 81 is specifically configured to:

select, from the plurality of pilot signals, a pilot signal corresponding to the selected codebook.

Optionally, the selection module 81 is specifically configured to:

determine, according to a random access preamble used by user equipment UE and from the plurality of candidate codebooks indicated by the SCMA parameter information, at least one codebook corresponding to the random access preamble, where a codebook quantity of the at least one codebook is less than a quantity of the plurality of codebooks indicated by the SCMA parameter information; and select a codebook from the determined at least one codebook.

Optionally, the selection module 81 is specifically configured to:

determine, as the plurality of candidate codebooks indicated by the SCMA parameter information, a plurality of codebooks that match a codeword length and a quantity of non-zero elements in a codeword that are indicated by the SCMA parameter information.

Optionally, the selection module 81 is specifically configured to:

select, based on a size of the uplink user data, a codeword quantity from a plurality of codeword quantities supported by each candidate codebook indicated by the SCMA parameter information; and map the uplink user data to the codeword of the selected codebook based on the selected codebook and the selected codeword quantity.

Optionally, the apparatus further includes:

a detection module 83, configured to: after the sending module 82 sends the uplink user data and the selected pilot signal to the network-side device, detect a feedback message of the network-side device on a physical hybrid automatic repeat request indicator channel PHICH resource corresponding to the selected pilot signal, where the feedback message is used to feed back an ACK message indicating that the uplink user data of the UE is correctly received or a NACK message indicating that the uplink user data of the UE is not correctly received; and the sending module 82 is further configured to:

retransmit the uplink user data after the detection module 83 detects the non-acknowledgement NACK message.

Optionally, the selected codebook is a first codebook, and the sending module 82 is specifically configured to retransmit the uplink user data in the following steps:

reselecting a second codebook different from the first codebook, mapping the uplink user data to a codeword of the second codebook, and reselecting, from the plurality of pilot signals indicated by the pilot signal parameter information, a pilot signal corresponding to the second codebook; and sending, to the network-side device on the time-frequency resource indicated by the random access response message, the uplink user data mapped to the codeword of the second codebook and the pilot signal corresponding to the second codebook.

Optionally, the sending module 82 is specifically configured to:

reselect, from a plurality of codebooks that match a codeword length and a quantity of non-zero elements in a codeword that are corresponding to the first codebook, the second codebook different from the first codebook; or adjust a codeword length and/or a quantity of non-zero elements in a codeword that are/is corresponding to the first codebook, and reselect the second codebook from a plurality of codebooks that match an adjusted codeword length and/or an adjusted quantity of non-zero elements in a codeword.

Embodiment 5

Figure 9:
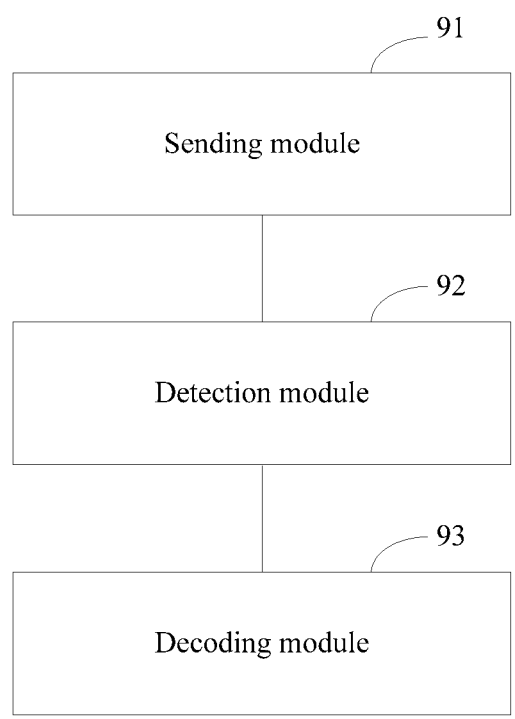
FIG. 9 is a schematic structural diagram of an uplink transmission apparatus in random access according to Embodiment 5 of the present disclosure.

As shown in FIG. 9, FIG. 9 is a schematic structural diagram of an uplink transmission apparatus in random access according to Embodiment 5 of the present disclosure. The apparatus includes:

a sending module 91, configured to send pilot signal parameter information to UE within a coverage area, where the pilot signal parameter information is used to indicate a plurality of candidate pilot signals to the UE;

a detection module 92, configured to: detect a plurality of pilot signals on a time-frequency resource indicated by a sent random access response message, and transmit a detection result to a decoding module 93; and the decoding module 93, configured to: after the detection module 92 detects the plurality of pilot signals, decode, based on the plurality of detected pilot signals, uplink user data sent by a plurality of user equipments UEs on the time-frequency resource.

Optionally, the decoding module 93 is specifically configured to:

perform uplink channel estimation based on each detected pilot signal, and determine a codebook corresponding to the pilot signal; and decode, based on an uplink channel estimation result and the determined codebook, uplink user data corresponding to the pilot signal.

Optionally, the sending module 91 is further configured to:

before the detection module 92 detects the plurality of pilot signals, send sparse code multiple access SCMA parameter information to the UE within the coverage area, where the SCMA parameter information is used to indicate a plurality of candidate codebooks to the UE.

Optionally, the SCMA parameter information includes parameter information used to indicate one or more of the following information:

a codeword length of each candidate codebook;

a quantity of non-zero elements in a codeword of each candidate codebook; or a plurality of codeword quantities supported by each candidate codebook.

Optionally, the detection module 92 is specifically configured to:

determine, according to a random access preamble used by the UE and from the plurality of candidate codebooks indicated by the SCMA parameter information, at least one codebook corresponding to the random access preamble, where a codebook quantity of the at least one codebook is less than a quantity of the plurality of codebooks indicated by the SCMA parameter information; and detect, based on a pilot signal corresponding to each of the determined at least one codebook, the plurality of pilot signals on the time-frequency resource indicated by the sent random access response message.

Optionally, the decoding module 93 is specifically configured to:

decode, based on the plurality of detected pilot signals and in a multi-UE multiple-input multiple-output MU-MIMO mode, the uplink user data sent by the plurality of UEs on the time-frequency resource.

Optionally, the sending module 91 is further configured to:

after the uplink user data is decoded, send feedback messages to the UEs on physical hybrid automatic repeat request indicator channel PHICH resources corresponding to the plurality of detected pilot signals, where the feedback message is used to feed back an ACK message indicating that the uplink user data of the UE is correctly received or a NACK message indicating that the uplink user data of the UE is not correctly received.

Optionally, the plurality of UEs are in an idle state; and the sending module 91 is further configured to:

after the decoding module 93 successfully decodes the uplink user data sent by the plurality of UEs on the time-frequency resource, send a contention resolution message to the plurality of UEs in the idle state, where the contention resolution message includes indication information indicating that the uplink user data sent by the plurality of UEs in the idle state is decoded successfully and a cell radio network temporary identifier C-RNTI allocated to each UE in the idle state.

Embodiment 6

Figure 10:
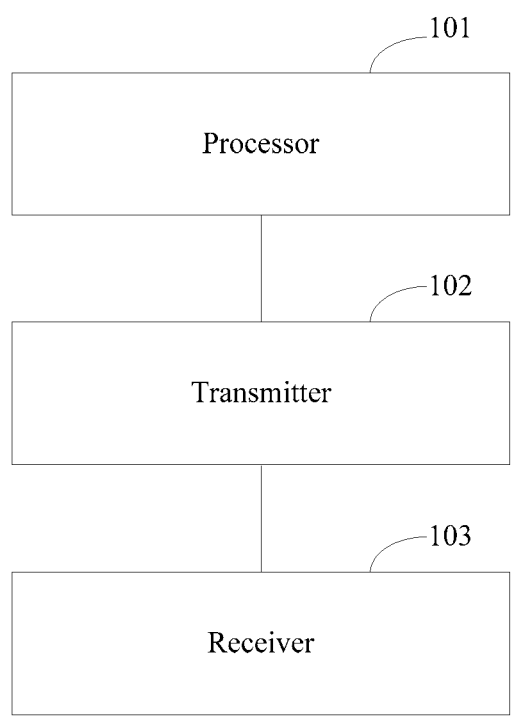
FIG. 10 is a schematic structural diagram of an uplink transmission device in random access according to Embodiment 6 of the present disclosure.

As shown in FIG. 10, FIG. 10 is a schematic structural diagram of an uplink transmission device in random access according to Embodiment 6 of the present disclosure. The device includes:

a processor 101, configured to: select, after determining that a random access response message sent by a network-side device is received, a pilot signal from a plurality of pilot signals indicated by pilot signal parameter information sent by a network-side device, and transmit the selected pilot signal and to-be-sent uplink user data to a transmitter 102; and the transmitter 102, configured to send, to the network-side device on a time-frequency resource indicated by the random access response message, the uplink user data and the selected pilot signal that are transmitted by the processor.

Optionally, the processor 101 is further configured to:

before the transmitter 102 sends the uplink user data and the selected pilot signal to the network-side device, select a codebook from a plurality of candidate codebooks indicated by sparse code multiple access SCMA parameter information sent by the network-side device, and map the uplink user data to a codeword of the selected codebook; and the transmitter 102 is specifically configured to:

send, to the network-side device, the uplink user data mapped by the processor 101 to the codeword and the selected pilot signal.

Optionally, the processor 101 is specifically configured to:
select, from the plurality of pilot signals, a pilot signal corresponding to the selected codebook.

Optionally, the processor 101 is specifically configured to:
determine, according to a random access preamble used by user equipment UE and from the plurality of candidate codebooks indicated by the SCMA parameter information, at least one codebook corresponding to the random access preamble, where a codebook quantity of the at least one codebook is less than a quantity of the plurality of codebooks indicated by the SCMA parameter information; and select a codebook from the determined at least one codebook.

Optionally, the processor 101 is specifically configured to:
determine, as the plurality of candidate codebooks indicated by the SCMA parameter information, a plurality of codebooks that match a codeword length and a quantity of non-zero elements in a codeword that are indicated by the SCMA parameter information.

Optionally, the processor 101 is specifically configured to:
select, based on a size of the uplink user data, a codeword quantity from a plurality of codeword quantities supported by each candidate codebook indicated by the SCMA parameter information; and map the uplink user data to the codeword of the selected codebook based on the selected codebook and the selected codeword quantity.

Optionally, the device further includes:
a receiver 103, configured to: after the transmitter 102 sends the uplink user data and the selected pilot signal to the network-side device, detect a feedback message of the network-side device on a physical hybrid automatic repeat request indicator channel PHICH resource corresponding to the selected pilot signal, where the feedback message is used to feed back an ACK message indicating that the uplink user data of the UE is correctly received or a NACK message indicating that the uplink user data of the UE is not correctly received; and the transmitter 102 is further configured to:
retransmit the uplink user data after the receiver 103 detects the non-acknowledgement NACK message.

Optionally, the selected codebook is a first codebook, and the transmitter 102 is specifically configured to retransmit the uplink user data in the following steps:
reselecting a second codebook different from the first codebook, mapping the uplink user data to a codeword of the second codebook, and reselecting, from the plurality of pilot signals indicated by the pilot signal parameter information, a pilot signal corresponding to the second codebook; and sending, to the network-side device on the time-frequency resource indicated by the random access response message, the uplink user data mapped to the codeword of the second codebook and the pilot signal corresponding to the second codebook.

Optionally, the transmitter 102 is specifically configured to:
reselect, from a plurality of codebooks that match a codeword length and a quantity of non-zero elements in a codeword that are corresponding to the first codebook, the second codebook different from the first codebook; or
adjust a codeword length and/or a quantity of non-zero elements in a codeword that are/is corresponding to the first codebook, and reselect the second codebook from a plurality of codebooks that match an adjusted codeword length and/or an adjusted quantity of non-zero elements in a codeword.

Embodiment 7

Figure 11:
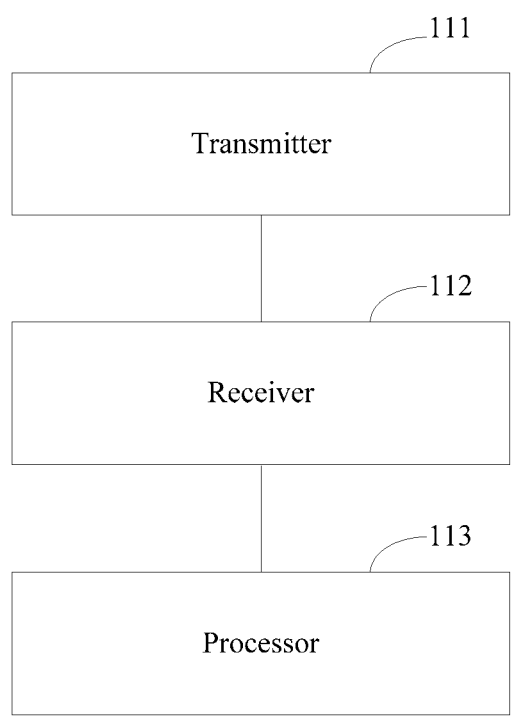
FIG. 11 is a schematic structural diagram of an uplink transmission device in random access according to Embodiment 7 of the present disclosure.

As shown in FIG. 11, FIG. 11 is a schematic structural diagram of an uplink transmission device in random access according to Embodiment 7 of the present disclosure. The device includes:

a transmitter 111, configured to send pilot signal parameter information to UE within a coverage area, where the pilot signal parameter information is used to indicate a plurality of candidate pilot signals to the UE;

a receiver 112, configured to: detect a plurality of pilot signals on a time-frequency resource indicated by a random access response message sent by the transmitter 111, and transmit a detection result to a processor 113; and the processor 113, configured to: after the receiver 112 detects the plurality of pilot signals, decode, based on the plurality of detected pilot signals, uplink user data sent by a plurality of user equipments UEs on the time-frequency resource.

Optionally, the processor 113 is specifically configured to:
perform uplink channel estimation based on each detected pilot signal, and determine a codebook corresponding to the pilot signal; and decode, based on an uplink channel estimation result and the determined codebook, uplink user data corresponding to the pilot signal.

Optionally, the transmitter 111 is further configured to:
before the processor 113 detects the plurality of pilot signals, send sparse code multiple access SCMA parameter information to the UE within the coverage area, where the SCMA parameter information is used to indicate a plurality of candidate codebooks to the UE.

Optionally, the SCMA parameter information includes parameter information used to indicate one or more of the following information:
a codeword length of each candidate codebook;
a quantity of non-zero elements in a codeword of each candidate codebook; or
a plurality of codeword quantities supported by each candidate codebook.

Optionally, the processor 113 is specifically configured to:
determine, according to a random access preamble used by the UE and from the plurality of candidate codebooks indicated by the SCMA parameter information, at least one codebook corresponding to the random access preamble, where a codebook quantity of the at least one codebook is less than a quantity of the plurality of codebooks indicated by the SCMA parameter information; and detect, based on a pilot signal corresponding to each of the determined at least one codebook, the plurality of pilot signals on the time-frequency resource indicated by the sent random access response message.

Optionally, the processor 113 is specifically configured to:
decode, based on the plurality of detected pilot signals and in a multi-UE multiple-input multiple-output MU-MIMO mode, the uplink user data sent by the plurality of UEs on the time-frequency resource.

Optionally, the transmitter 111 is further configured to:
after the uplink user data is decoded, send feedback messages to the UEs on physical hybrid automatic repeat request indicator channel PHICH resources corresponding to the plurality of detected pilot signals, where the feedback message is used to feed back an ACK message indicating that the uplink user data of the UE is correctly received or a NACK message indicating that the uplink user data of the UE is not correctly received.

Optionally, the plurality of UEs are in an idle state; and the transmitter 111 is further configured to:

after the processor 113 successfully decodes the uplink user data sent by the plurality of UEs on the time-frequency resource, send a contention resolution message to the plurality of UEs in the idle state, where the contention resolution message includes indication information indicating that the uplink user data sent by the plurality of UEs in the idle state is decoded successfully and a cell radio network temporary identifier C-RNTI allocated to each UE in the idle state.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the apparatus (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the present disclosure without departing from the scope of the present disclosure. The present disclosure is intended to cover these modifications and variations provided that they fall within the scope of protection defined by the following claims and their equivalent technologies.

What is claimed is:

1. An uplink transmission method in random access, wherein the method comprises:
    receiving, by user equipment (UE), a random access response message from a network-side device;
    selecting, by the UE, a pilot signal from a plurality of pilot signals, wherein the plurality of pilot signals are indicated by pilot signal parameter information sent by the network-side device, and wherein the pilot signal parameter information includes a cyclic shift of each pilot signal of the plurality of pilot signals;
    selecting, by the UE, a codebook from a plurality of candidate codebooks indicated by sparse code multiple access (SCMA) parameter information sent by the network-side device;
    mapping, by the UE, uplink user data to a codeword of the selected codebook; and
    sending, by the UE, the uplink user data mapped to the codeword and the selected pilot signal to the network-side device on a time-frequency resource indicated by the random access response message.

2. The method of claim 1, wherein the selecting, by UE, a pilot signal from a plurality of pilot signals indicated by pilot signal parameter information sent by the network-side device comprises:
    selecting, by the UE and from the plurality of pilot signals, a selected pilot signal corresponds to the selected codebook.

3. The method of claim 1, wherein the selecting, by the UE, a codebook from a plurality of candidate codebooks indicated by SCMA parameter information sent by the network-side device comprises:
    determining, by the UE according to a used random access preamble and from the plurality of candidate codebooks indicated by the SCMA parameter information, at least one codebook corresponding to the random access preamble, wherein a quantity of the at least one codebook is less than a quantity of the plurality of codebooks indicated by the SCMA parameter information; and
    selecting, by the UE, the codebook from the determined at least one codebook.

4. The method of claim 1, wherein determining, by the UE, the plurality of candidate codebooks indicated by the SCMA parameter information sent by the network-side device comprises:
    determining, by the UE as the plurality of candidate codebooks indicated by the SCMA parameter information, a plurality of codebooks that match a codeword length and a quantity of non-zero elements in a codeword that are indicated by the SCMA parameter information.

5. The method of claim 1, wherein the mapping, by the UE, uplink user data to a codeword of the selected codebook comprises:
    selecting, by the UE based on a size of the uplink user data, a codeword quantity from a plurality of codeword quantities supported by each candidate codebook indicated by the SCMA parameter information; and
    mapping, by the UE, the uplink user data to the codeword of the selected codebook based on the selected codebook and the selected codeword quantity.

6. A user equipment (UE) device comprising:
    a transceiver;

at least one processor;

a non-transitory computer-readable storage medium coupled to the at least one processor and storing programming instructions for execution by the at least one processor, the programming instructions instruct the at least one processor to:

receive a random access response message from a network-side device;

select a pilot signal from a plurality of pilot signals, wherein the plurality of pilot signals are indicated by pilot signal parameter information sent by the network-side device, and wherein the pilot signal parameter information includes pilot index numbers of the plurality of pilot signals;

select a codebook from a plurality of candidate codebooks indicated by sparse code multiple access (SCMA) parameter information sent by the network-side device:

map uplink user data to a codeword of the selected codebook; and send the uplink user data mapped to the codeword and the selected pilot signal to the network-side device on a time-frequency resource indicated by the random access response message.

7. The device of claim 6, wherein the programming instructions instruct the at least one processor to select, from the plurality of pilot signals, a pilot signal corresponding to the selected codebook.

8. The device of claim 6, wherein the programming instructions instruct the at least one processor to:

determine, according to a random access preamble used by the UE and from the plurality of candidate codebooks indicated by the SCMA parameter information, at least one codebook corresponding to the random access preamble, wherein a codebook quantity of the at least one codebook is less than a quantity of the plurality of codebooks indicated by the SCMA parameter information; and select a codebook from the determined at least one codebook.

9. The device of claim 6, wherein the programming instructions instruct the at least one processor to determine, as the plurality of candidate codebooks indicated by the SCMA parameter information, a plurality of codebooks that match a codeword length and a quantity of non-zero elements in a codeword that are indicated by the SCMA parameter information.

10. The device of claim 6, wherein the programming instructions instruct the at least one processor to:

select, based on a size of the uplink user data, a codeword quantity from a plurality of codeword quantities supported by each candidate codebook indicated by the SCMA parameter information; and map the uplink user data to the codeword of the selected codebook based on the selected codebook and the selected codeword quantity.

11. A network side device comprising:

a transceiver;

at least one processor;

a non-transitory computer-readable storage medium coupled to the at least one processor and storing programming instructions for execution by the at least one processor, wherein the programming instructions instruct the at least one processor to:

send pilot signal parameter information to user equipment (UE) within a predetermined coverage area, wherein the pilot signal parameter information is used to indicate a plurality of candidate pilot signals to the UE, and wherein the pilot signal parameter information includes a time-domain extension code of each pilot signal of the plurality of pilot signals;

send sparse code multiple access (SCMA) parameter information to the UE within the predetermined coverage area, wherein the SCMA parameter information is used to indicate a plurality of candidate codebooks to the UE;

determine, according to a random access preamble used by the UE and from the plurality of candidate codebooks indicated by the SCMA parameter information, at least one codebook corresponding to the random access preamble, wherein a codebook quantity of the at least one codebook is less than a quantity of the plurality of codebooks indicated by the SCMA parameter information;

detect, based on a pilot signal corresponding to each of the determined at least one codebook, a plurality of pilot signals on a time-frequency resource indicated by a random access response message;

perform uplink channel estimation based on each detected pilot signal;

determine a codebook corresponding to the pilot signal; and decode, based on the plurality of detected pilot signals, uplink user data sent by a plurality of UEs on the time-frequency resource, wherein decoding the uplink user data includes decoding, based on an uplink channel estimation result and the determined codebook, the uplink user data corresponding to the pilot signal.

12. The device of claim 11, wherein the SCMA parameter information comprises parameter information used to indicate at least one of a codeword length of each candidate codebook, a quantity of non-zero elements in a codeword of each candidate codebook, and a plurality of codeword quantities supported by each candidate codebook.

13. The device of claim 11, wherein the programming instructions instruct the at least one processor to:

decode, based on the plurality of detected pilot signals and in a multi-UE multiple-input multiple-output (MU-MIMO) mode, the uplink user data sent by the plurality of UEs on the time-frequency resource.

\* \* \* \* \*

UNITED STATES PATENT AND TRADEMARK OFFICE
CERTIFICATE OF CORRECTION

PATENT NO. : 10,616,921 B2
APPLICATION NO. : 15/907012
DATED : April 7, 2020
INVENTOR(S) : Xun Tang, Wei Quan and Jian Zhang Page 1 of 1

It is certified that error appears in the above-identified patent and that said Letters Patent is hereby corrected as shown below:

In the Claims

In Column 29, Line 18, in Claim 6, delete "device:" and insert -- device; --, therefor.

Signed and Sealed this
Fourteenth Day of July, 2020

Andrei Iancu
*Director of the United States Patent and Trademark Office*